2 Sheets.
Sheet 1.

J. H. Lyon's Seal Lock.

No. 4,620. Reissued Oct. 31, 1871.

Witnesses.
W. H. Lett
Alfred Shedlock

John H. Lyon
Inventor.

AM. PHOTO-LITHOGRAPHIC CO. N.Y. (OSBORNE'S PROCESS.)

2 Sheets.
Sheet 2.

J. H. Lyon's Seal Lock.

No. 4,620. Reissued Oct. 31, 1871.

Witnesses.

W. M. Pelt

Alfred Shedlock

John H. Lyon
Inventor.

AM. PHOTO-LITHOGRAPHIC CO N.Y. (OSBORNE'S PROCESS.)

UNITED STATES PATENT OFFICE.

JOHN H. LYON, OF NEW YORK, N. Y.

IMPROVEMENT IN LOCKS AND DETECTERS.

Specification forming part of Letters Patent No. 25,428, dated September 13, 1859; reissue No. 849, dated November 8, 1859; reissue No. 4,620, dated October 31, 1871.

*To all whom it may concern:*

Be it known that I, JOHN H. LYON, of the city and county of New York, State of New York, have invented an Improved Lock and Detecter, which I term a Seal-Lock; and I do hereby declare that the following is a full and correct description thereof, reference being had to the accompanying drawing and to the letters of reference thereon.

Figure 1:
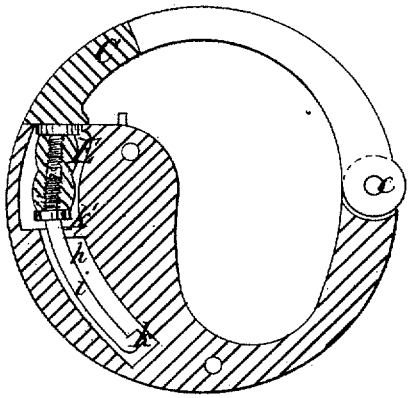
Figure 2:
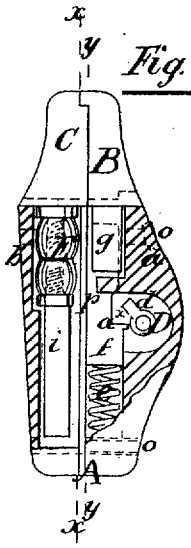
Figure 3:
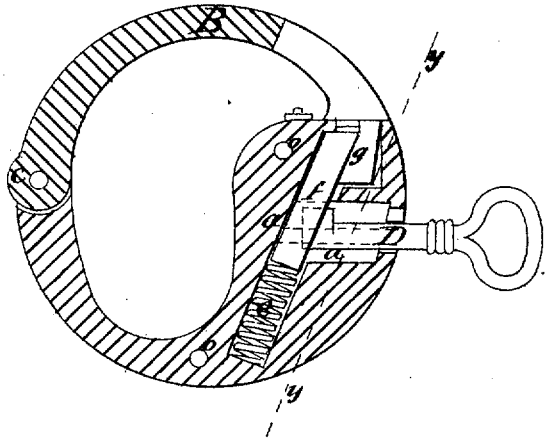
Figure 4:
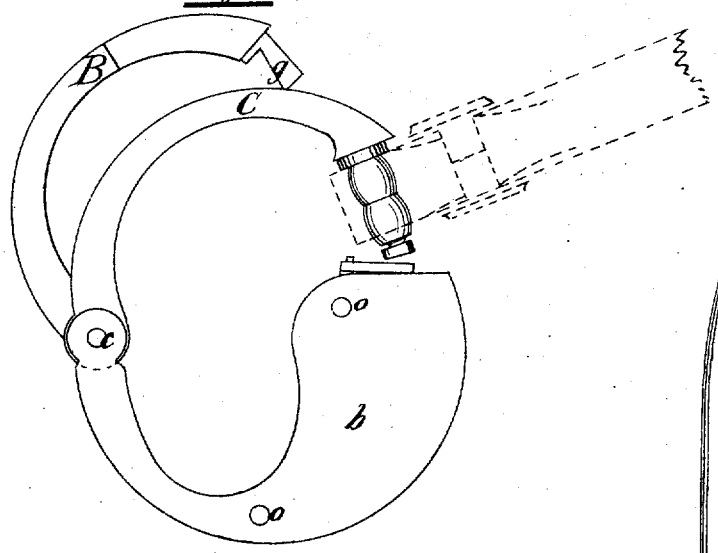
Figure 5:
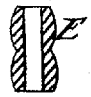
Figure 6:
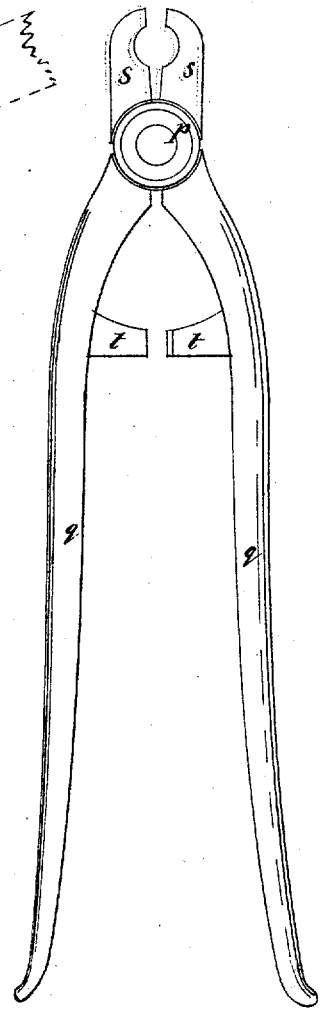

Figure 1 is a side sectional view of my improved seal-lock taken in the line *x x*, Fig. 2. Fig. 2 is a front sectional view of the same taken in the line *y y*, Fig. 3. Fig. 3 is a side sectional view of the same taken in the line *z z*, Fig. 2. Fig. 4 is a side view of the same, showing the way in which the seals are adjusted. Fig. 5 is a detached sectional view of the seal. Fig. 6 is a view of the swage and nippers employed for adjusting the seal to the lock and severing the same.

Similar letters of reference indicate corresponding parts in the several figures.

This invention consists in combining with a padlock, or any lock provided with a shackle, a supplemental shackle, so arranged as to be locked or fastened with a lead or other soft-metal tube which must be severed in order to detach the lock, the severed tube indicating that the lock has been opened.

To enable those skilled in the art to fully understand and construct my invention, I will proceed to describe it.

Referring to the drawing, A represents the case of the lock, which may be of semi-annular or any proper form. This case A is formed of two parts, *a b*, precisely similar in form, and each provided with a shackle, B C, which is fitted on a common center-pin, *c*, that passes through both parts *a b* of the case at one end, and also serves as a means of connection as well as a pivot for the shackle. The shackles B C may be of the usual bow or semicircular form, and the outer end of each passes a short distance into its part of the case, a recess or opening being made in each part *a b* for such purpose. The recess *d* in the part *a* of the case A is formed in its inner side, and in said recess a spiral spring, *e*, is placed, and also a square bar, F, the latter resting on the spring *e*. The spring *e* has a tendency to keep the bar *f* forced upward and the end of the shackle B secured in the upper part of the recess *d*, (see Fig. 3,) in which it will be seen that the end of the shackle B is provided with a dovetail terminus, *g*, which is the cause of the bar *f* securing the shackle B. The bar *f* is depressed by a key, D, a recess and a lip being at the inner side of the bar *f*, the bit of the key when turned acting against the lip *a**, (see Fig. 2.) In the recess *h* of the part *b* of the case A a short bar, *i*, is placed and allowed to work loosely. This bar, however, is prevented from passing entirely out of the recess *h* by means of a lip, K, on its lower end, and a stop or projection, K′, in the recess *h*, as shown clearly in Fig. 1. The upper part of the recess *h*, above the stop or projection K′, is larger than the lower part, in order that it may receive a lead or other soft-metal tube, E, the lower part of which is secured on a screw, *m*, at the upper end of the bar *i*. The upper part of this tube E is secured on a screw, *n*, attached to the end of the shackle C. The two parts *a b* of the case A are connected together by screws *o o*, and, as the recesses *d h* are formed in the inner and adjoining sides of the parts *a b*, I place a short metal division-plate, *p*, between them, as shown in Fig. 2. The tubes E are cast in proper quantities, and each overseer or superintendent is supplied with them, as well as with the tool shown in Fig. 6, which is formed of two handles, *q q*, curved and connected by a fulcrum-pin, *r*, and terminating in jaws S S, grooved transversely so as to form a swage to grasp and compress the tubes E on the screws *m n*. At the inner side of each handle *q* a cutter, *t*, is attached, by which the tubes are divided.

The device is used as follows: When the lock is applied both shackles, B C, are passed through the staple and the shackle B locked. Previous, however, to locking the shackle B a tube, E, is compressed and secured on the screws *m n* of the bar *i* and shackle C, the tube fitting loosely on the screws at first, but swaged or compressed tightly on them by the jaws S S of the tool represented in Fig. 6, the bar *i* being allowed a requisite movement in its recess *h* to admit of its screw *m* passing out of the part *b* of the case A. When the shackle B is locked it keeps the shackle C down to the case by means of a shoulder-lock, *u u*, as clearly shown in Fig. 2, a shoulder, *u*, being on the inner side of each shackle, and so disposed that they fit over each other, or overlap.

It will be seen from the above description that in order to detach the lock the soft-metal tube E must be divided, as it cannot be stripped from the screws, and this would, of course, indicate that the lock had been opened.

If the invention be used on the freight-cars on railroads, the depot-masters will be provided with tubes and a swaging-tool, so as to open the locks, and, after the goods are removed, apply new tubes E and relock the locks.

Postmasters might also be similarly provided, and the dishonesty of mail contractors guarded against.

I claim—

1. In combination with a padlock or other lock provided with a shackle, a supplemental shackle arranged with a lead or soft metal-tube so as to be temporarily secured thereby to the lock-case, and admitting of being released only by severing of said tube, which thereby serves as a detecter, substantially as described.

2. The lock-case A, formed of the two parts *a* *b*, with a division-plate, *p*, between, substantially as and for the purpose described.

3. The soft-metal tube E, in combination with the shackle C, by means of a screw or screws, *m* *n*, upon which the tube is compressed, whereby the tube may be readily removed by unscrewing it from the ends of the shackle after it has been severed, substantially as described.

JOHN H. LYON.

Witnesses:

ALFRED SHEDLOCK,
WM. F. LETT.

(93)